United States Patent
Davidoski

(10) Patent No.: US 6,626,501 B2
(45) Date of Patent: Sep. 30, 2003

(54) POSITIONING MEANS FOR POSITIONING THE VALVE STEM OF AN INNER TUBE

(76) Inventor: Paul Davidoski, 31316 Via Colinas Suite 113, Westlake Village, CA (US) 91362

( * ) Notice: Subject to any disclaimer, the term of this patent is extended or adjusted under 35 U.S.C. 154(b) by 0 days.

(21) Appl. No.: 09/776,460

(22) Filed: Jan. 17, 2001

(65) Prior Publication Data
US 2002/0135224 A1 Sep. 26, 2002

Related U.S. Application Data
(60) Provisional application No. 60/176,763, filed on Jan. 19, 2000.

(51) Int. Cl.[7] .................................................. B60C 29/06
(52) U.S. Cl. ...................................... 301/5.24; 152/428
(58) Field of Search ............................... 301/5.24, 37.1, 301/63.101, 95.101; 152/427, 428; 220/288; 284/74.1, 65

(56) References Cited

U.S. PATENT DOCUMENTS

| | | | | |
|---|---|---|---|---|
| 115,127 A | * | 5/1871 | Snyder et al. | |
| 1,370,395 A | * | 3/1921 | Anderson | |
| 1,381,627 A | * | 6/1921 | Garrett | |
| 1,412,055 A | * | 4/1922 | Hartog | |
| 1,612,984 A | * | 1/1927 | Preston | |
| 1,672,489 A | * | 6/1928 | Henemier | |
| 1,689,649 A | * | 10/1928 | Wagonhorst | |
| 1,694,459 A | * | 12/1928 | Volckhausen | |
| 2,475,451 A | * | 7/1949 | Gouirand | |
| 2,580,343 A | * | 12/1951 | Benoit | |
| 2,638,956 A | * | 5/1953 | Nelson et al. | |
| 1,968,840 A | * | 1/1961 | Morse | |
| 3,086,679 A | * | 4/1963 | Bijvoet | |
| 3,931,998 A | * | 1/1976 | Carson | |
| 4,411,302 A | * | 10/1983 | Kuypers | |
| 5,154,308 A | * | 10/1992 | Larson | |

* cited by examiner

Primary Examiner—Russell D. Stormer
(74) Attorney, Agent, or Firm—Thomas W. Secrest

(57) ABSTRACT

A bicycle may have a combination comprising a wheel and a rim with a hole in the rim, an inner tube with a valve stem in the hole in the rim, and a tire. If the air pressure is low in the inner tube and the bicycle is ridden with the wheel rotating, the valve stem and the wheel may move with respect to each other. The valve stem is in the opening in the rim. With the low air pressure in the inner tube, the inner tube may slip or move with respect to the rim. The slippage or moving places a stress on the valve stem with the possibility of damaging the inner tube and valve stem and causing the air leak as the valve stem is not definitely positioned. The subject invention is a decorative stabilizing device for definitely positioning the valve stem with respect to the rim and lessening the possibility of causing an air leak in the bicycle inner tube.

3 Claims, 2 Drawing Sheets

POSITIONING MEANS FOR POSITIONING THE VALVE STEM OF AN INNER TUBE

CROSS-REFERNCES TO RELATED PATENT APPLICATIONS (if any)

This is a provisional application No. 60/176,763 filed on Jan. 19, 2000.

There is a design patent number D 452,212 S.

STATEMENT REGARDING FEDERALLY SPONSORED RESEARCH AND DEVELOPMENT

This invention was developed with private funds and there was not federally sponsored research.

REFERENCE TO A MICROFICHE APPENDIX

This section is not applicable to this patent application.

BACKGROUND THE INVENTION

1. Field of the Invention

The field of the invention is a provision of a stabilizing means for a valve stem for an inner tube in particular, the invention is a stabilizing means for a valve stem for an inner tube for a bicycle tire.

2. Description of the Related Art Including Information Disclosed Under 37 CFR 1.97 and 37 CFR 1.98

There is no closely related art to the subject invention.

For years there has been used a cover for valve stems on inner tubes. The valve stem may be attached to an inner tube or to the rim of a wheel. The cover precludes dirt getting into the valve stem.

BRIEF SUMMARY OF THE INVENTION

A bicycle comprises a bicycle wheel, a rim, an inner tube, and a bicycle tire.

In the rim there is a hole for receiving the valve stem of the inner tube.

If the air pressure in the inner tube becomes low, then the inner tube and the rim may move and slip with respect to each other. The valve stem is in the hole in the rim and the inner tube moves with respect to the rim. The valve stem may be sheared off of the inner tube or a hole may develop adjacent to the connection of the valve stem with the inner tube. As a result, the inner tube will leak and will not hold air. The bicycle cannot be ridden and used as the tire is flat.

The invention provides a mounting base to fit over the hole in the rim and contacts the inner surface of the rim. There is a passageway in the mounting base for receiving the externally threaded valve stem.

There is a tapped cap positioned on the mounting base. This tapped cap screws onto the threaded valve stem and draws the valve stem through the hole or opening in the mounting base and also through the hole or opening in the rim. With the tightening of the tapped cap, the valve stem and the inner tube are definitely positioned with respect to the rim. As a result, the inner tube will not slip or move with respect to the rim and/or the tire.

OBJECTS AND ADVANTAGES

An object is to provide a means for definitely positioning a valve stem on an inner tube with respect to a rim;

Another object is to provide an inexpensive means for definitely positioning the valve stem of an inner tube;

A further object is to provide a decorative means for definitely positioning the valve stem of an inner tube; and Additional objects, advantages and novel features of the invention will be set forth in part in the description which follows, and in part will become apparent to those skilled in the art upon examination of the following or may be learned by the practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

In the drawings it is seen that FIG. 1 is a side elevational view of the invention and it is to be understood that the other side elevational view is the same.

DETAILED DESCRIPTION OF THE INVENTION

Figure 1:
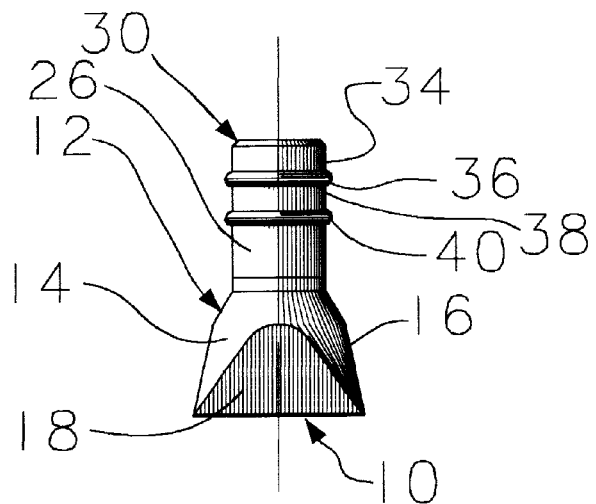
Figure 2:
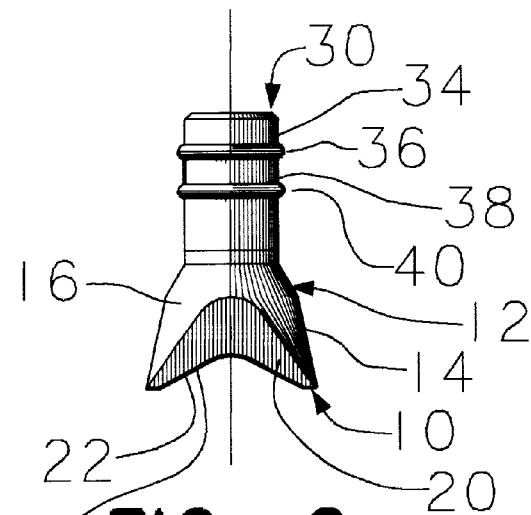
FIG. 2 is an end elevational view of the invention and it is to be understood that the other end elevational view is the same.

In the drawings it is seen that there is a positioning means 10 comprising a mounting base 12 and a screw cap 30. The screw cap 30 has a recess 31 or a hollow interior 31.

The mounting base 12 comprises a first side or a left side 14 and a second side or a right side 16.

There is a front flat area 18 joining the sides 14 and 16.

There is rear flat area 20 joining the sides 14 and 16.

There is a recess 22 in the base 12 and in the left side 4 and also a recess 22 in the right side 16. The recess 22 defines concave surface 23 in the base 12.

Figure 4:
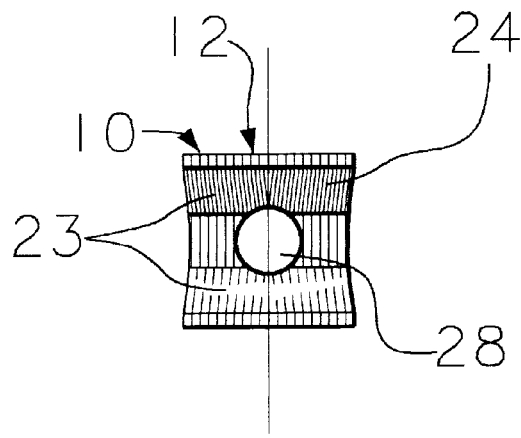
FIG. 4 is a bottom plan view of the invention.
Figure 5:
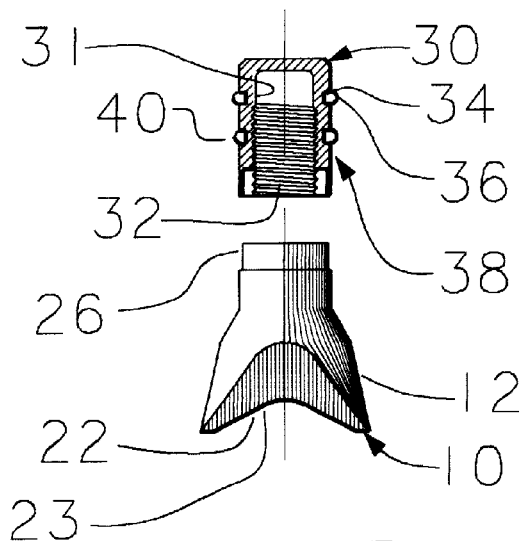
FIG. 5 is a view of the mounting base and a cross-sectional view of the tapped cap.

In FIG. 4 it is seen that there is a lower surface 24 in the recess 22.

The base comprises a mounting stem 26. In the base 12 and in the mounting stem 26 there is a through passageway 28.

The screw cap 30 rests on the mounting stem 26 and on the base 12. The recess 31 in the screw cap 30 is tapped at 32. On the outer surface of the screw cap 30 there is an upper external recess 34. In the upper external recess 34 there is positioned an O-ring 36.

Figure 3:
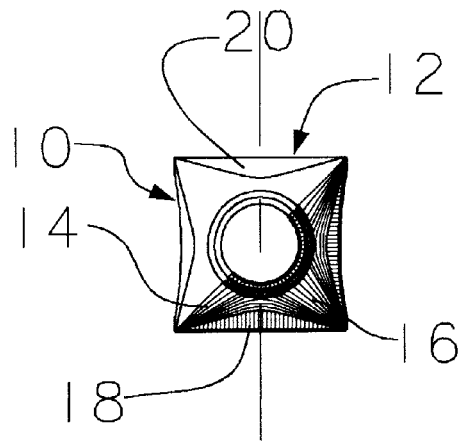
FIG. 3 is a top plan view of the invention.

In FIG. 3 it is seen that on the screw cap 30 there is a lower external recess 38. In the lower external recess 38 there is positioned a lower o-ring 40.

Figure 6:
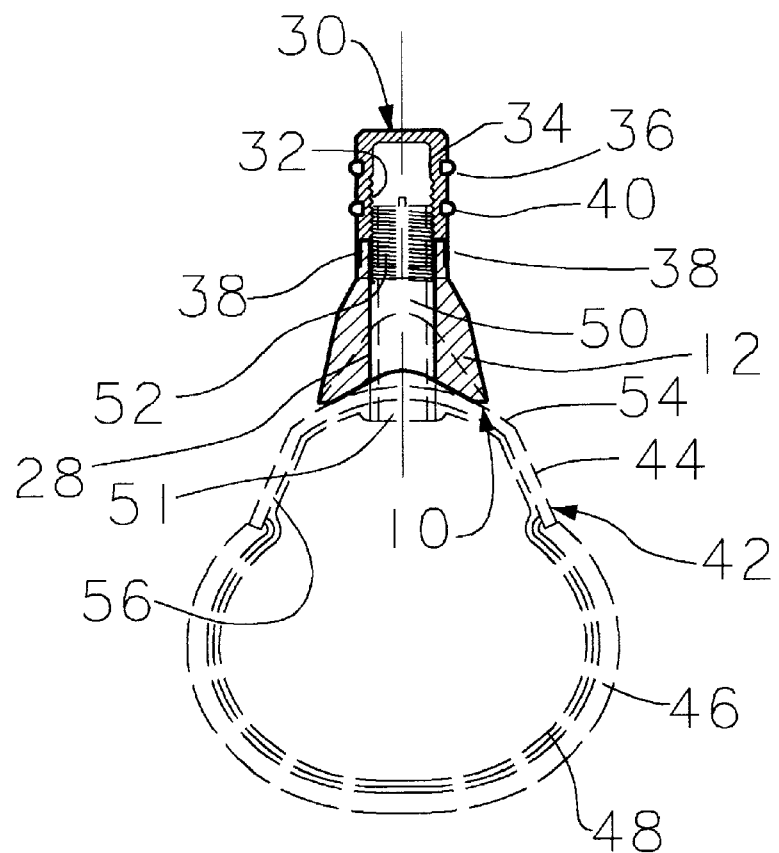
FIG. 6 is a cross-sectional view of the rim of the bicycle wheel and the opening or hole in the rim of the bicycle wheel and the threaded valve stem in the opening in the rim or wheel of the bicycle wheel and the inner tube on the outside of the rim; and the mounting base on the inside surface of the rim; the passageway in the mounting base and the tapped cap on the inside of the mounting base and screwed onto the inside of the valve stem.

In FIG. 6 it is seen that there is a wheel 42 having a rim 44. A tire 46 is positioned on the wheel 42 and in contact with the rim 44. Inside of the tire 46 there is an inner tube 48. The tire 46 contacts the external surface of the rim 44.

There is a valve stem 50 on the inner tube 48.

There is a passageway 51 in rim 44. The passageway 28 and in the positioning means 10 or in the mounting base 12 and the passageway 51 in the rim 44 are aligned.

The valve stem 50 on the inner tube 48 is positioned in the passageway 28 and is also positioned in the passageway 51 so as to project inwardly into the wheel 42.

The valve stem 50 is externally threaded at 52.

The mounting base 12 is positioned on the inner surface 56 of the rim 44. The screw cap 30 is screwed onto the externally threaded valve stem 52 so as to draw the valve stem inwardly towards the center of the wheel 42 and also to dr the inner tube 48 to be in snug contact with the external surface 54 of the rim 44. The result is the inner tube 48 cannot move readily even if the inner tube is low on air pressure. The mounting base 12 and the screw cap 30 definitely position the inner tube with respect to the rim 44. This precludes, even with low air pressure in the inner tube 48, the inner tube 48 moving inside of the tire 46.

What is claimed is:

1. A combination comprising a mounting base and a positioning means; said mounting base having a mounting stem; said positioning means having a hollow interior; the dimension of said mounting stem and said positioning means being such that said mounting base and said positioning means co-fit with each other to form an integral unit; a rim having an inner surface; aid mounting base juxtapositioned to said inner surface; said rim having an outer surface; an inner tube juxtapositioned to said outer surface; said mounting stem being on a first end of said mountain base; said mounting base having a second end opposed to said first end; said second end having a concave surface; said mounting base having a through passageway; with said positioning means co-fitting with said mounting base said hollow interior and said through passageway are aligned; said hollow interior being internally tapped; a passageway in said rim; said passageway in said rim, said hollow interior and said through passageway being in alignment; said inner tube having a valve stem; said valve stem being positioned in said passageway in said rim, said hollow interior, and said through passageway; said positioning means having an exterior surface; a contact gripping means on said exterior surface; said mounting base and a positioning means and a recess in said exterior surface; an O-ring in said recess in said exterior surface; said valve stem having external threads; and said external threads mating with said tapped hollow interior.

2. A process for making a combination of a mounting base, a positioning means, a rim, and an inner tube forming said mounting base to have a mounting stem; forming said positioning means to have a hollow interior; forming said mounting base and said positioning means to co-fit with each other to form an integral unit forming a rim having an inner surface; juxtapositioning said mounting base and said inner surface; forming said rim to have an outer surface; juxtapositioning said outer surface and said inner tube; forming said mounting stem on a first end of said mounting base; forming said mounting base with a second end opposed to said first end; forming said second end with a concave surface; juxtapositioning said concave surface and said mounting base; forming a hole in laid rim; forming said mounting base with a rough passageway; positioning said positioning means on said mounting base; aligning said hole, said through passageway, and said hollow interior; positioning said valve stem in said hole and in said through passageway and in said hollow interior; tapping said hollow interior; forming said positioning means with an exterior surface, forming A gripping means on said exterior surface; a positioning means, a rim, and an inner tube, forming a recess in said exterior surface, positioning an O-ring in said recess in said exterior surface; tapping said hollow interior; said valve stem having external hreads; and mating said tapped hollow interior and said threaded valve stem to draw the inner tube to the outer surface of the nut.

3. A combination of a mounting base, a positioning means, a rim, and an inner tube and made by a process comprising forming said mounting base to have a mounting stem; forming said positioning means to have a hollow interior; forming said mounting base and said positioning means to co-fit with each other to form an integral unit; forming a rim having an inner surface; juxtapositioning said mounting base and said inner surface; forming said rim to have an outer surface; juxtapositioning said outer surface and said inner tube; forming said mounting stem on a first end of said mounting base; forming said mounting base with a second end opposed to said first end; forming said second end with a concave surface; juxtapositioning said concave surface and said mounting base; forming a hole in paid rim; forming said mounting base with a through passageway; positioning said positioning means on said mounting base; aligning said hole said through passageway, and said hollow interior; positioning said valve stem in said hole and in said through passageway and in said hollow interior; tapping said hollow interior; forming said positioning means with an exterior surface; forming a gripping means on said exterior surface; a mounting base, a positioning means, a rim, and an inner tube and comprising forming a recess in said exterior surface; positioning an O-ring in said recess in said exterior surface; tapping said hollow interior; said valve stem having external threads; and mating sail tapped hollow interior and said threaded valve stem to draw the inner tube to the outer surface of the rim.

\* \* \* \* \*